United States Patent
Skomra et al.

(10) Patent No.: US 12,418,318 B1
(45) Date of Patent: Sep. 16, 2025

(54) APPARATUSES AND METHODS FOR COMPENSATION OF TRANSMITTER DISTORTIONS

(71) Applicant: Nokia Solutions and Networks Oy, Espoo (FI)

(72) Inventors: Lukasz Skomra, Wroclaw (PL); Björn Jelonnek, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/081,213

(22) Filed: Mar. 17, 2025

(30) Foreign Application Priority Data

Mar. 18, 2024 (FI) ...................................... 20245315

(51) Int. Cl.
  *H04B 1/12* (2006.01)
  *H04L 27/26* (2006.01)
  *H04W 52/36* (2009.01)

(52) U.S. Cl.
  CPC ........... *H04B 1/12* (2013.01); *H04L 27/2614* (2013.01); *H04W 52/365* (2013.01)

(58) Field of Classification Search
  CPC ..... H04B 1/12; H04L 27/2614; H04W 52/365
  See application file for complete search history.

(56) References Cited

U.S. PATENT DOCUMENTS

| | | |
|---|---|---|
| 9,531,411 B2 | 12/2016 | Chapman et al. |
| 11,121,899 B2 | 9/2021 | Zou et al. |
| 11,605,887 B1 | 3/2023 | Sharma et al. |
| 2020/0052945 A1 | 2/2020 | Kant et al. |
| 2020/0244326 A1* | 7/2020 | Daugherty ........... H04B 7/0602 |

(Continued)

FOREIGN PATENT DOCUMENTS

| | | |
|---|---|---|
| RU | 2368044 C1 | 9/2009 |
| WO | 2023/277739 A1 | 1/2023 |

OTHER PUBLICATIONS

Muneer et al., "System Design and Performance for Antenna Reservation in Massive MIMO", IEEE 96th Vehicular Technology Conference (VTC2022-Fall), Sep. 26-29, 2022, 5 pages.

(Continued)

*Primary Examiner* — Junpeng Chen
(74) *Attorney, Agent, or Firm* — Nokia Technologies Oy

(57) ABSTRACT

Example embodiments provide a method for compensating transmitter distortions. The compensation can be performed with tapered antenna elements. The method comprises determining a first subset of antennas of an antenna array, wherein the first subset of antennas operate without a power headroom in relation to one or more thresholds; determining a second subset of antennas of the antenna array, wherein the second subset of antennas comprise one or more antennas that operate with a power headroom in relation to the one or more thresholds; calculating compensation signals for distortions of wanted signals to be transmitted with the first subset of antennas to one or more user devices; combining the compensation signals with wanted signals to be transmitted with the second subset of antennas to the one or more user devices; and transmitting, with the second subset of antennas, the compensation signals combined with the wanted signals. An apparatus, a method, and a computer program are disclosed.

15 Claims, 6 Drawing Sheets

(56) References Cited

U.S. PATENT DOCUMENTS

| | | | |
|---|---|---|---|
| 2021/0066813 A1 | 3/2021 | Salman | |
| 2021/0282143 A1* | 9/2021 | Lee | H04W 52/343 |
| 2021/0377094 A1* | 12/2021 | Yunusov | H04L 27/3863 |
| 2021/0409128 A1* | 12/2021 | Raghavan | H04B 7/0617 |

OTHER PUBLICATIONS

Khan et al., "On PAPR Reduction and Transmit Distortion Compensation in Massive MIMO OFDM Systems", IEEE 93rd Vehicular Technology Conference (VTC2021-Spring), Apr. 25-28, 2021, 5 pages.

Hohne et al., "Phase Noise in Beamforming", IEEE Transactions on Wireless Communications, vol. 9, No. 12, Dec. 2010, pp. 3682-3689.

"IEEE 802.11", Wikipedia, Retrieved on Mar. 13, 2025, Webpage available at : https://en.wikipedia.org/wiki/IEEE_802.11.

Office Action received for corresponding Finnish U.S. Appl. No. 20/245,315, dated Oct. 11, 2024, 10 pages.

Kageyama et al., "Enhanced Peak Cancellation With Simplified In-Band Distortion Compensation for Massive MIMO-OFDM", IEEE Access, vol. 8, Apr. 7, 2020, pp. 73420-73431.

Skomra et al., "Is Antenna Reservation Superior to Increasing Input Back-off in 5G Massive MIMO Base Stations?", IEEE 98th Vehicular Technology Conference (VTC2023-Fall), Oct. 10-13, 2023, 6 pages.

Office Action received for corresponding Finnish Patent Application No. 20245315, dated Feb. 18, 2025, 5 pages.

Extended European Search Report received for corresponding European Patent Application No. 25163373.1, dated Jul. 15, 2025, 5 pages.

Prabhu et al., "A low-complex peak-to-average power reduction scheme for OFDM based massive MIMO systems", 6th International Symposium on Communications, Control and Signal Processing (ISCCSP), May 21-23, 2014, pp. 114-117.

* cited by examiner

| Number of UEs (K) | Angular positions of UEs [deg] | mean EVM over UEs [%] | | |
|---|---|---|---|---|
| | | tapered | tapered with compensation in 25% of antennas | tapered with compensation in 50% of antennas |
| 1 | 22.0 | 17.0 | 6.1 | 4.5 |
| 2 | 22.0, -38.7 | 16.9 | 5.8 | 4.3 |
| 4 | 22.0, -38.7, -54.3, 0.0 | 13.0 | 2.8 | 2.2 |
| 6 | 22.0, -38.7, -54.3, 0.0, -18.2, 61.0 | 13.2 | 2.6 | 2.0 |

APPARATUSES AND METHODS FOR COMPENSATION OF TRANSMITTER DISTORTIONS

RELATED APPLICATION

This application claims benefit of priority from Finnish Patent App. No. 20245315, filed Mar. 18, 2024, the disclosure of which is hereby incorporated in its entirety by reference herein.

TECHNICAL FIELD

The present application generally relates to information technology. Some example embodiments of the present application relate to compensation of transmitter distortions using antenna array elements, such as tapered antenna elements.

BACKGROUND

Distortions in transmission chains of beamforming base stations can limit the achievable downlink data rates. Distortions can be caused by, for example, hardware components and digital signal processing algorithms of the base stations. Some techniques used to compensate the distortions may increase cost or complexity of the base stations. It would be beneficial to alleviate at least one of these drawbacks.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may enable using antennas which operate with a power headroom, e.g., below a threshold such as an average output power over all antennas of an antenna array, to compensate distortions introduced in the antennas of the antenna array operating without a power headroom. Hence, the antennas can be split to the two disjoint subsets of antennas, distorting antennas and compensating antennas. When using tapered antenna array, the provided compensation may allow to maintain the peak power capabilities of the power amplifiers associated with the antennas on a similar level as for a non-tapered antenna array, while keeping a same equivalent isotropic radiated power and a same over-the-air error vector magnitude. Hence, the costs and power consumption of the tapered antenna arrays may be reduced. This may be achieved by the features of the independent claims. Further implementation forms are provided in the dependent claims, the description, and the drawings.

According to a first aspect, a method may comprise determining a first subset of antennas of an antenna array, wherein the first subset of antennas operate without a power headroom in relation to one or more thresholds; determining a second subset of antennas of the antenna array, wherein the second subset of antennas comprise one or more antennas that operate with a power headroom in relation to the one or more thresholds; calculating compensation signals for distortions of wanted signals to be transmitted with the first subset of antennas to one or more user devices; combining the compensation signals with wanted signals to be transmitted with the second subset of antennas to the one or more user devices; and transmitting, with the second subset of antennas, the compensation signals combined with the wanted signals.

According to an example embodiment of the first aspect, the antenna array is a tapered antenna array.

According to an example embodiment of the first aspect, the one or more thresholds are based on power capabilities and one or more additional constraints related to the antenna array.

According to an example embodiment of the first aspect, the one or more thresholds are antenna-specific.

According to an example embodiment of the first aspect, the method may comprise performing distortion estimation for each antenna path of the first subset of antennas for the wanted signal; calculating the compensation signals for each antenna path of the second subset of antennas based on the estimated distortions; and combining the compensation signals with the wanted signals of each antenna path of the second subset of antennas.

According to an example embodiment of the first aspect, the estimated distortions are provided as frequency domain symbols or time domain signals.

According to an example embodiment of the first aspect, calculation of the compensation signals comprises receiving time domain data streams representing per-antenna estimates of a portion of the time-domain distortions of the wanted signals from the first subset of antennas; demodulating the time domain data streams to generate frequency domain representation of the distortion estimates; estimating unwanted parts of the transmitted signals received by the one or more user devices from the first subset of antennas based on the frequency domain representation of distortion estimates and estimated channel responses between the first subset of antennas and the one or more user devices; calculating compensation symbols based on the estimated unwanted parts of the transmitted signals; precoding the compensation symbols with precoding weights of the wanted signals of the second subset of antennas; and modulating the precoded compensation symbols to generate a time-domain precoded compensation signal for each antenna of the second subset of antennas.

According to an example embodiment of the first aspect, the compensation signals are combined with the wanted signals of the second subset of antennas in the time-domain after modulation of the respective wanted signals.

According to an example embodiment of the first aspect, the compensation signals are combined with the wanted signals of the second subset of antennas in the frequency domain before modulation of the respective wanted signals.

According to an example embodiment of the first aspect, the compensation signals are combined with the wanted signals of the second subset of antennas by combining the compensation signals with data symbols for the wanted signals before precoding of the data symbols.

According to an example embodiment of the first aspect, the method may comprise performing a peak-to-average-power ratio, PAPR, reduction for each wanted signal; and estimating the distortions based on a difference between the wanted signals of the first subset of antennas before and after the PAPR reduction.

According to an example embodiment of the first aspect, the compensation signals are calculated based on at least a partial representation of the distortion.

According to an example embodiment of the first aspect, the method may comprise updating the first subset of antennas and the second subset of antennas based on a dynamically changing power headroom.

According to an example embodiment of the first aspect, the first subset of antennas and the second subset of antennas are determined statically based on a planned tapering solution.

According to a second aspect, an apparatus may comprise at least one processor; and at least one memory including instructions which, when executed with the at least one processor, cause the apparatus at least to determine a first subset of antennas of an antenna array, wherein the first subset of antennas operate without a power headroom in relation to one or more thresholds; determine a second subset of antennas of the antenna array, wherein the second subset of antennas comprise one or more antennas that operate with a power headroom in relation to the one or more thresholds; calculate compensation signals for distortions of wanted signals to be transmitted with the first subset of antennas to one or more user devices; combine the compensation signals with wanted signals to be transmitted with the second subset of antennas to the one or more user devices; and transmit, with the second subset of antennas, the compensation signals combined with the wanted signals.

According to an example embodiment of the second aspect, the antenna array is a tapered antenna array.

According to an example embodiment of the second aspect, the one or more thresholds are based on power capabilities and one or more additional constraints related to the antenna array.

According to an example embodiment of the second aspect, the one or more thresholds are antenna-specific.

According to an example embodiment of the second aspect, the at least one memory includes instructions which, when executed with the at least one processor, cause the apparatus to perform distortion estimation for each antenna path of the first subset of antennas for the wanted signal; calculate the compensation signals for each antenna path of the second subset of antennas based on the estimated distortions; and combine the compensation signals with the wanted signals of each antenna path of the second subset of antennas.

According to an example embodiment of the second aspect, the estimated distortions are provided as frequency domain symbols or time domain signals.

According to an example embodiment of the second aspect, calculation of the compensation signals comprises causing the apparatus to receive time domain data streams representing per-antenna estimates of a portion of the time-domain distortions of the wanted signals from the first subset of antennas; demodulate the time domain data streams to generate frequency domain representation of the distortion estimates; estimate unwanted parts of the transmitted signals received by the one or more user devices from the first subset of antennas based on the frequency domain representation of distortion estimates and estimated channel responses between the first subset of antennas and the one or more user devices; calculate compensation symbols based on the estimated unwanted parts of the transmitted signals; precode the compensation symbols with precoding weights of the wanted signals of the second subset of antennas; and modulate the precoded compensation symbols to generate a time-domain precoded compensation signal for each antenna of the second subset of antennas.

According to an example embodiment of the second aspect, the compensation signals are combined with the wanted signals of the second subset of antennas in the time-domain after modulation of the respective wanted signals.

According to an example embodiment of the second aspect, the compensation signals are combined with the wanted signals of the second subset of antennas in the frequency domain before modulation of the respective wanted signals.

According to an example embodiment of the second aspect, the compensation signals are combined with the wanted signals of the second subset of antennas by combining the compensation signals with data symbols for the wanted signals before precoding of the data symbols.

According to an example embodiment of the second aspect, the at least one memory includes instructions which, when executed with the at least one processor, cause the apparatus to perform a peak-to-average-power ratio, PAPR, reduction for each wanted signal; and estimate the distortions based on a difference between the wanted signals of the first subset of antennas before and after the PAPR reduction.

According to an example embodiment of the second aspect, the compensation signals are calculated based on at least a partial representation of the distortion.

According to an example embodiment of the second aspect, the at least one memory includes instructions which, when executed with the at least one processor, cause the apparatus to update the first subset of antennas and the second subset of antennas based on a dynamically changing power headroom.

According to an example embodiment of the second aspect, the first subset of antennas and the second subset of antennas are determined statically based on a planned tapering solution.

According to a third aspect, a computer program may be configured, when executed by a processor, to cause an apparatus at least to perform the following: determine a first subset of antennas of an antenna array, wherein the first subset of antennas operate without a power headroom in relation to one or more thresholds; determine a second subset of antennas of the antenna array, wherein the second subset of antennas comprise one or more antennas that operate with a power headroom in relation to the one or more thresholds; calculate compensation signals for distortions of wanted signals to be transmitted with the first subset of antennas to one or more user devices; combine the compensation signals with wanted signals to be transmitted with the second subset of antennas to the one or more user devices; and transmit, with the second subset of antennas, the compensation signals combined with the wanted signals. The computer program may further comprise instructions for causing the apparatus to perform any example embodiment of the method of the first aspect.

According to a fourth aspect, an apparatus may comprise means for determining a first subset of antennas of an antenna array, wherein the first subset of antennas operate without a power headroom in relation to one or more thresholds; determining a second subset of antennas of the antenna array, wherein the second subset of antennas comprise one or more antennas that operate with a power headroom in relation to the one or more thresholds; calculating compensation signals for distortions of wanted signals to be transmitted with the first subset of antennas to one or more user devices; combining the compensation signals with wanted signals to be transmitted with the second subset of antennas to the one or more user devices; and transmitting, with the second subset of antennas, the compensation signals combined with the wanted signals. The apparatus may further comprise means for performing any example embodiment of the method of the first aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

Like references are used to designate like parts in the accompanying drawings.

DETAILED DESCRIPTION

Figure 1:
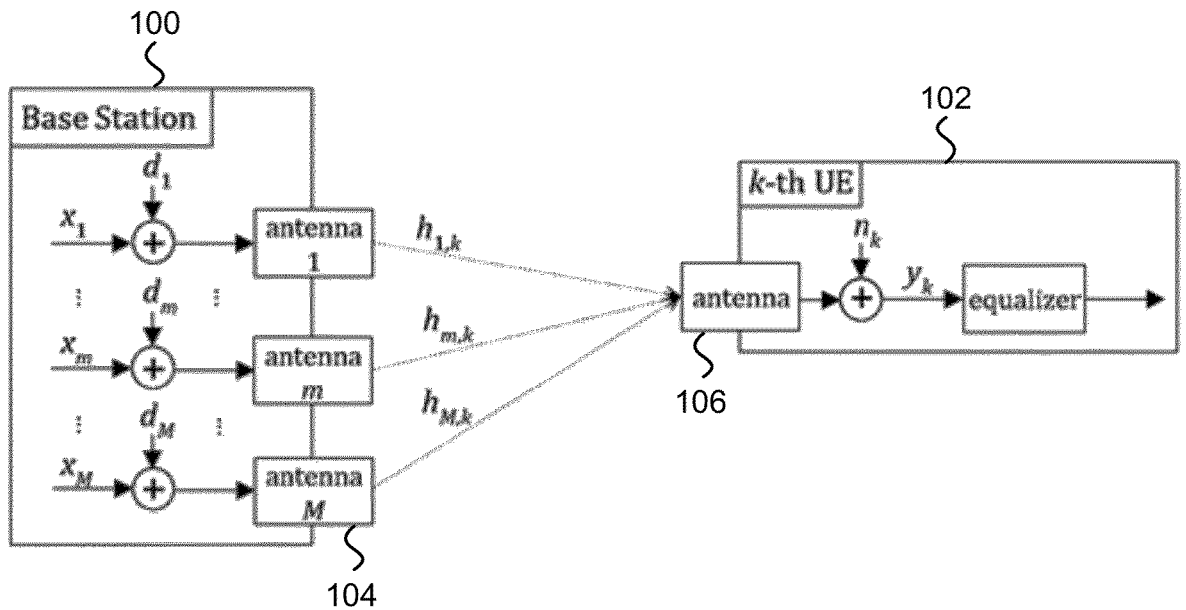
FIG. 1 illustrates an example of a communication system comprising a base station with an antenna array and one or more single-antenna user equipment according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of operations for constructing and operating the example. However, the same or equivalent functions and sequences may be accomplished by different examples.

Tapering of antenna array elements is a method to reduce level of sidelobes, by gradually reducing the per antenna power from the center elements towards the edges of the antenna array. An antenna array is a set of multiple connected antennas which are configured to work together as a single antenna, to transmit or receive radio waves. Tapering can be used to reduce inter-beam interferences. However, when tapering is used, the level of sidelobes is reduced at the cost of widening the main beam and a reduction of directivity. For example, a 1.4 dB reduction for Hamming tapering weights and 1.6 dB reduction for Hanning tapering weights for a uniform linear array with 32 omnidirectional antennas, compared with no tapering, can be observed when antenna arrays use the same total radiated power. This means, that in order to provide the same level of equivalent isotropic radiated power, like for a non-tapered antenna array, the total radiated power (TRP) needs to be increased for the tapered arrays. For example, a TRP increase of 1.4 dB for the example Hamming tapering and 1.6 dB for the example Hanning tapering would be required to achieve 45 dB EIRP on the main beam direction. This can be realized by proportionally increasing the per antenna average power for each antenna element (AE) in the array, compared with a non-tapered antenna design.

Increase of the average power in the center AEs can be done as long as both per antenna average and peak power constraints are not exceeded. Otherwise, power amplifiers (PAS) with higher average and/or peak output power capabilities need to be employed.

Base stations can comprise multiple transmission chains, wherein each transmission chain is configured to feed a single AE in a digital beamforming architecture. Each transmission chain may contain a PA, which has limited average and peak output power capabilities. The higher these limits are, the higher is the cost of used PAs and heat dissipation of the PAs. Also, power consumption of the PA increases when it operates closer to the limits.

When a tapered antenna array keeps the same TRP like in case without tapering, then a substantial increase in the required average power capability can be observed in a subset of AEs around the center of the array. In case the same per antenna power constraint (PAPC) like in the case without tapering is used (i.e., the average output power capabilities of PAs are not increased) then the EIRP is significantly reduced. For example, EIRP of a non-tapered antenna array may be 45.0 dBm in the main beam direction, 43.6 dBm when Hamming tapering is used and 43.4 dBm when Hanning tapering is used, and when TRP is kept the same. However, when keeping PAPC the same (e.g., by proportionally scaling down per antenna power to reduce TRP), EIRP would decrease to 39.5. when Hamming tapering is used and to 39.3. when Hanning tapering is used for the antenna array.

When a base station is deployed as a part of a cell site which is supposed to provide a required cell coverage, it may be assumed that a tapered antenna array should provide the same EIRP as an antenna array without tapering. This means that the TRP needs to be increased, compared with a non-tapered array to compensate for the directivity loss caused by tapering. The PAs used in a tapered antenna arrays (or at least a number of PAs in the middle of the array) may need to be able to tolerate higher PAPC than in the antenna array not using tapering.

The maximum peak-to-average-power ratio (PAPR) of a signal using the maximum allowed output power is limited by the peak output power constraints. Therefore, peak power limitation solutions, commonly termed as PAPR reduction or crest factor reduction, can be used.

The required peak output power capabilities are related with the level of allowed distortions of the wanted signal which can be introduced in the transmission paths. The limits of tolerable errors, covering both distortions and noise in the transmission paths, applicable in-band are expressed in terms of error vector magnitude (EVM), which can be measured per antenna (i.e., conducted measurement) or over-the-air (i.e., radiated measurement). In addition to modulation order specific limits defined by 3GPP (e.g., 3.5% for 256QAM, 8.0% for 64QAM), some additional design targets may be set.

The combination of the EIRP and over-the-air (OTA) EVM requirements can lead to a decision on the selection of PAs with certain average and peak output power capabilities, determining a cost and power consumption of the base station. At the same time, from the perspective of downlink data rate achievable by a user equipment (UE) served by the base station, an important aspect is the power of the received wanted signal in relation to the power of the received distortions.

Each transmission chain in the base station can introduce distortions and noise into the wanted signal. Common sources of distortions are related with hardware components like PAs, local oscillators, and digital-to-analog converters. However, digital signal processing algorithms, especially peak power limitation solutions, may also introduce distortions.

This disclosure focuses on a base station using single-polarized antennas for transmission to single-antenna UEs. However, both the problem and embodiments described herein are valid for dual-polarized transmission and multi-antenna UEs as well.

FIG. 1 illustrates an example of a communication system comprising a base station 100 with an antenna array and one or more single-antenna user equipment 102 according to an example embodiment.

A signal received by a k-th single-antenna UE 102 in downlink is a linear combination of signals transmitted from the base station 100 on all M antennas 104 (or antenna elements) through a propagation channel. In a cellular network, each UE can receive interferences from other cells and/or sectors. However, here the impact of the inter-cell and inter-sector interferences is neglected, and the focus is on situations when the UE is distortion-limited.

A UE may be also referred to as a client node, a user node or a user device. Communications between UE 102 and base station 100 may be bidirectional. Hence, any of the devices may be configured to operate as a transmitter and/or a receiver. Base stations may be also called radio access network (RAN) nodes and they may be part of a radio access network between the core network and the UEs. Base stations may be generally referred to as network elements, network nodes or network devices. The base station 100 may be, for example, a gNB. Although depicted as a single device, a network node may not be a stand-alone device, but for example a distributed computing system coupled to a remote radio head.

The communication system may be configured for example in accordance with the 5th Generation digital cellular communication network, as defined by the 3rd Generation Partnership Project (3GPP). In one example, the communication system may operate according to 3GPP 5G-NR. It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

In LTE and 5G NR, data symbols can be transmitted in resource elements (REs), organized in orthogonal frequency division multiplexing (OFDM) symbols in time and subcarriers (SCs) in frequency. For a given OFDM symbol, a frequency domain data symbol received by the k-th UE 102 on j-th SC can be described as follows: $y_{k,j}=h_{k,j}^{H}(x_j+d_j)+n_{k,j}$, where $h_{k,j}^{H}$ is a 1×M vector representing channel responses from all M antennas 104 of the base station 100 to the k-th UE's antenna 106, $x_j$ is a M×1 vector of precoded data samples (transmitted from M antennas 104 to K UEs 102), $d_j$ is the M×1 vector representing TX distortions, and $n_{k,j}$ represents the receiver (RX) noise at the k-th UE's antenna 106. The term TX distortions is used for brevity. However, there can be also some noise introduced in the TX chain. The term RX noise covers the combined influence of the RX noise floor (related primarily with the thermal noise) as well as reception distortions and noise introduced in the RX processing chain.

Since the precoded data vector $x_j$ is constructed by summing up the K per-UE precoded data vectors, the signal received by the k-th UE 102 at j-th SC contains the wanted signal, inter-user interference (i.e., intra-sector interference in case of single cell), TX distortions and RX noise:

$$y_{k,j} = h_{k,j}^{H}(x_j+d_j)+n_{k,j} = h_{k,j}^{H}\left(x_{k,j}+\sum_{\substack{i=1\\i\neq k}}^{K}x_{i,j}+d_j\right)+n_{k,j}.$$

The error introduced by interferences, distortions and noise can be measured using the EVM. When the error is higher than tolerable by the used modulation and coding scheme (MCS) the transmission can fail, leading to limitation of the achievable downlink data rate.

This disclosure focuses on distortion-limited transmissions, with a special attention to the distortions resulting from PAPR reduction mechanism.

In order to use a tapered antenna array with the same EIRP and OTA EVM as a non-tapered array, the level of distortions received by UEs are desired to be such that the level is not higher than for the non-tapered array.

In the transmission chain, there may need to be a PAPR reduction mechanism which limits the peak power to a level that does not exceed the peak power capabilities of the PAs for each of the antennas. This can be achieved (while maintaining full downlink capacity and without a special reception implementation on the UE side) either by:

Peak-limiter type approaches, such as iterative clipping and filtering, which limit the peak power at the cost of distorting the wanted signal. These per-antenna PAPR reduction approaches can be used in both non-beamforming and beamforming base stations.

Distortion-free solutions using spatial degrees of freedom in massive MIMO (multiple-input, multiple-output) base stations, which are considerably more complex than the peak-limiter type of approaches.

It is assumed that a peak-limiter type of solution is used for PAPR reduction in order to keep the complexity of the transmission chain manageable. In this case, there are generally two classes of solutions to reduce the level of distortions:

Use of PAs with higher peak power capabilities (at least in the AEs in the center of the array), which increases the cost of the base station and power consumption.

Use spatial degrees of freedom in massive MIMO base station to partially compensate the introduced distortions (contrary to distortion-free solutions which can lead to 0% OTA EVM).

In one approach, compensation of distortions resulting from PAPR reduction can be made by reservation of a subset of TX antennas. For example, a set of $M_r$ reserved antennas for transmission of compensation signals for distortions introduced in a set of M antennas can be used for transmission of the wanted signals. However, a drawback of this approach is that a base station using $M+M_r$ antennas is able to achieve an array gain associated with M antennas only. This reduces the received power level (degrading the cell range and achievable data rates) compared to using all TX antennas for transmission of the wanted signals. In another approach, the antenna reservation approach is extended to cover compensation of distortions introduced by PAs, in addition to compensating the distortions resulting from PAPR reduction.

In one approach, instead of using a subset of reserved antennas, the radiation patterns of distortions resulting from PAPR reduction are modified to change the power levels of distortions received by UEs. In this approach, all M antennas are used for transmission of up to K=M/2 spatial data streams (i.e., MIMO layers). Modification of the radiation pattern of distortions is performed based on the information about the per-UE tolerable signal quality degradation. This approach is considered to be significantly more complex than the antenna reservation approach.

A problem with tapering of the antenna array elements to reduce the inter-beam interferences by reducing the power radiated in the sidelobes is that the tapering may lead to the need to use PAs with increased peak output power capabilities (at least for the PAs providing signal to the center AEs), when the same EIRP and OTA EVM requirements as for non-tapered antenna array are targeted.

In case the tapering is statically configured for a given device (i.e., not achieved by reducing the gain of precoding weights), the PAs used in different antenna paths can be different, with the average power capabilities aligned with the selected tapering weights.

In this case, the peak power capabilities can either follow average power capabilities with an equal PAPR (which is on the same level as for the non-tapered case), be equal in each antenna, which can lead to minimization of the required maximum peak power capability, or follow a solution that is between the two listed extremes.

Alternatively, if both non-tapered and tapered operating modes need to be supported, then the per antenna average output power capabilities may need to be selected as the worst case between both operating modes.

In a case of dynamically applicable tapering, the peak power capabilities can follow the same approach with equal peak power capabilities, like in the statically tapered case. The required peak output power capability may substantially increase compared to a non-tapered antenna array. For example, when comparing peak output capabilities of non-tapered and tapered antenna arrays, this can lead to a peak output power capability requirement of 40.4 dBm (i.e., 11.0 W, when tapered with equal peak power capability) instead of 36.5 dBm (i.e., 4.5 W, when non-tapered) and an increased power consumption.

An objective is to address the problem of the increase of peak output power capabilities of PAs used in tapered antenna arrays which may be required in order to keep the same cell range (i.e., same EIRP) and allow for the same downlink data rates (i.e., same OTA EVM) as for non-tapered antenna array.

Figure 2:
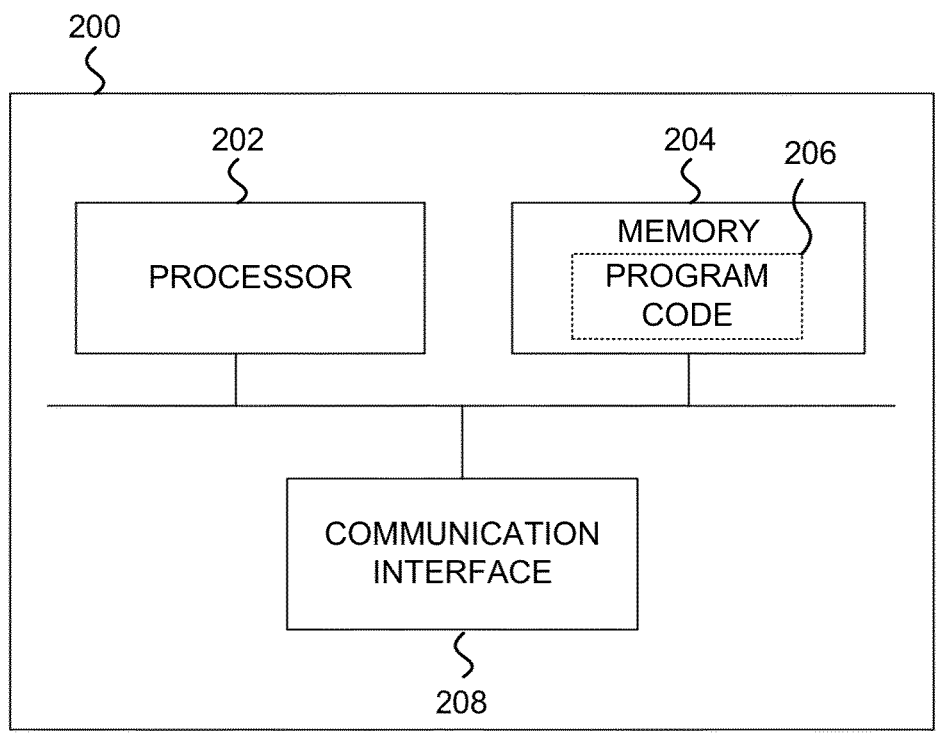
FIG. 2 illustrates an example of an apparatus configured to practice one or more example embodiments.

FIG. 2 illustrates an example of an apparatus 200 configured to practice one or more example embodiments. The apparatus 200 may be, for example, a network node such as the base station 100.

The apparatus 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The memory 204 may be configured to store, for example, computer program code 206 or the like, for example operating system software and application software. The memory 204 may comprise one or more volatile memory devices, one or more non-volatile memory devices, and/or a combination thereof. For example, the memory 204 may be embodied as magnetic storage devices (such as hard disk drives, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise one or more communication interfaces 208 configured to enable apparatus 200 to transmit information to other apparatuses, such as UEs. The one or more communication interfaces 208 may be further configured to enable the apparatus 200 to receive information from other apparatuses. The communication interface 208 may be configured to provide at least one wireless radio connection, such as for example a 3GPP mobile broadband connection (e.g., 3G, 4G, 5G, or beyond). However, the communication interface 208 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, an antenna array to transmit and/or receive radio frequency signals. One or more of the various types of connections may be also implemented as separate communication interfaces, which may be coupled or configured to be coupled to a plurality of antennas.

When the apparatus 200 is configured to implement some functionality, some component and/or components of the apparatus 200, such as for example the at least one processor 202 and/or the memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an embodiment, the apparatus 200 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 200 comprises means for performing at least one method described herein. In one example, the means comprises the at least one processor 202, the at least one memory 204 including program code 206 configured to, when executed by the at least one processor 202, cause the apparatus 200 to perform the method.

The apparatus 200 may comprise for example a computing device such as for example a base station, a network node, a server device, or the like. Although the apparatus 200 is illustrated as a single device it is appreciated that, wherever applicable, functions of apparatus 200 may be distributed to a plurality of devices.

According to an example embodiment, the apparatus 200 may be configured to use antennas of the antenna array which operate below a per antenna average power of a non-tapered antenna array to transmit compensation signals for distortions introduced in the antennas of the antenna array operating above this level. The compensation signals may be transmitted by the apparatus 200 in combination with wanted signals. As a result, a reduction of the received power of distortions can be achieved, compared to a situation without compensation. This may allow to maintain the peak power capabilities of PAs associated with the antennas on a level comparable to the level used in non-tapered antenna array, while keeping the same EIRP and the same OTA EVM limits. Alternatively, OTA EVM can be improved in case the EIRP for the tapered antenna array is allowed to decrease.

Figure 3:
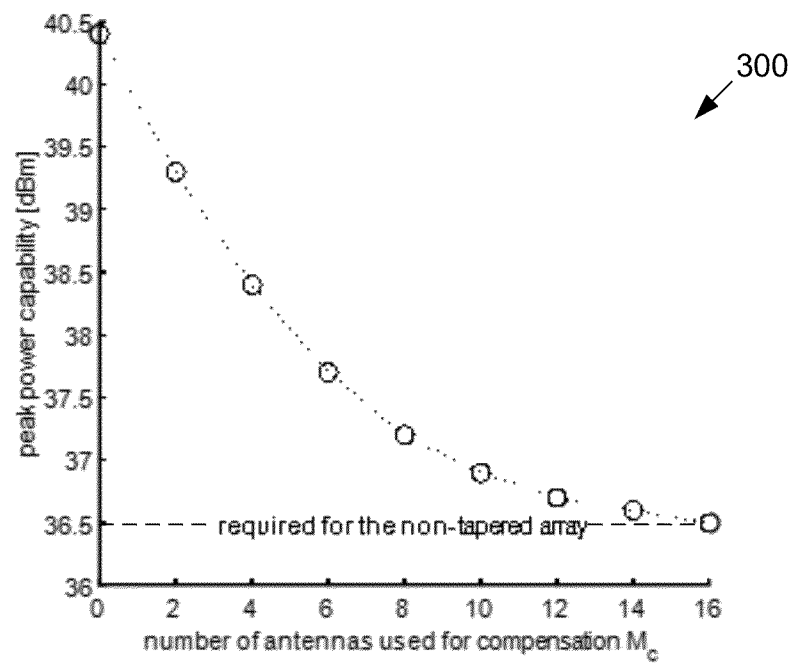
FIG. 3 illustrates an example graph of required peak power capability depending on a number of antennas used for compensation, according to an example embodiment.

The required peak power capability reduces with increasing the number of compensating antennas, as illustrated in FIG. 3. The graph 300 shows the required peak power capability depending on the number of antennas used for compensation of ULA (uniform linear array) with 32 omnidirectional antennas. By using all of the antennas that operate with a power headroom (e.g., in the example of FIG. 3, 16 out of the total of 32 antennas) for compensation, the required EIRP with the OTA EVM limit is achieved without an increase of the peak power capability compared with the non-tapered array case.

If the compensation was not applied, but both the peak power capabilities and EIRP were kept like for the non-tapered array, the OTA EVM would be 17% instead of 4%. Hence, when the compensation is used, the distortions from PAPR reduction can be lower by about 12 dB.

Figure 4:
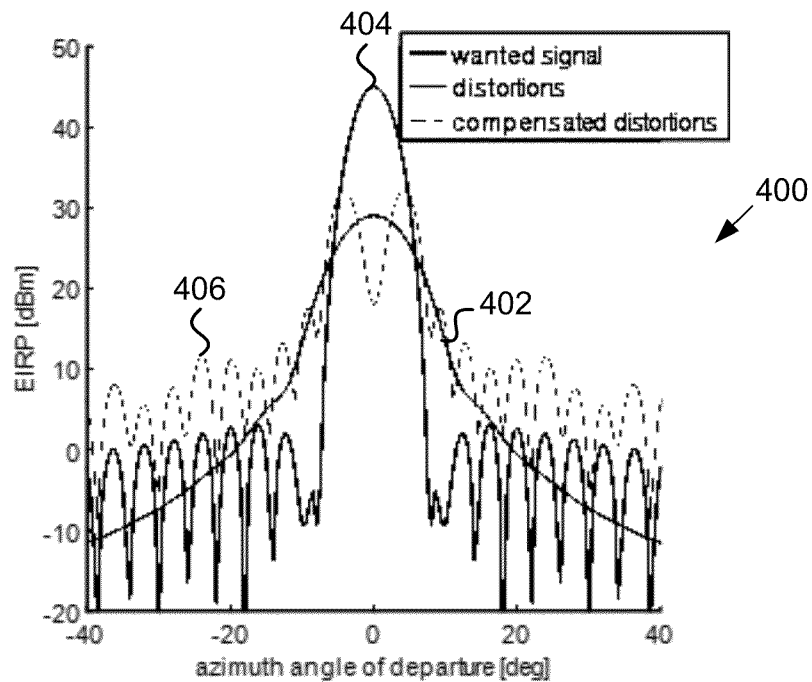
FIG. 4 illustrates a graph of example radiation patterns of a wanted signal, uncompensated distortions and compensated distortions, according to an example embodiment.

As visible in FIG. 3, it is possible to use only a subset of the antennas that operate with an average power headroom and still achieve a substantial reduction of the peak power capabilities. Power headroom refers to surplus power that may be additionally used by a transmitter device in addition to power currently being used for transmission. Even using only 2 antennas can reduce the peak power capabilities of the PAs by more than 1 dB, while using 8 antennas can bring a reduction by more than 3 dB, e.g., from 40.4 dBm down to 37.2 dBm. This allows to balance the added complexity in digital signal processing part of the downlink chain with the cost and power consumption of the analog part of the processing chain. FIG. 4 shows a graph 400 with example radiation patterns of a wanted signal 402 as well as the uncompensated distortions 402 and compensated distortions 404, when using 16 compensation antennas of the ULA with 32 omnidirectional antennas.

Although presented mainly with tapered antenna arrays in mind, in principle the compensation method described herein can also be used generally when the per antenna power in a subset of antennas is below the nominal level. However, substantial benefits can be observed when there is enough average power headroom in a subset of antennas.

In an example embodiment, antennas of an antenna array can be split into two disjoint subsets, wherein the first subset of antennas comprise distorting antennas (which distortions would be compensated) and the second subset of antennas comprise compensating antennas. Further, the compensation signals may be combined with the wanted signals in the second subset of antennas, before jointly going through a part of TX processing chain which can distort the signals. The second subset of antennas may be determined based on having power headroom (in relation to the average output power over all antennas—an equal share of TRP between antennas) to be used to compensate distortions from the first subset of antennas that operate without a power headroom. The first subset and the second subset of antennas can be determined by a base station with the antenna array. The base station may be further configured to determine the compensation signals, and combine the compensation signals with the wanted signals before transmission.

The second subset of antennas can comprise one or more of the antennas which are determined to have power headroom. For example, the antennas can be split to three subsets of antennas: distorting antennas, compensating antennas, and neutral antennas (with a power headroom but not used for compensation). The split between the compensating and distorting antennas may be performed based on one or more thresholds. The one or more thresholds can be based on power capabilities (e.g., average and peak) and some additional constraints (e.g., energy consumption, cell range, EVM). The threshold could be generally different for different antennas if PAs with different average and/or peak power capabilities are used in different antenna paths.

This allows to use tapered antenna arrays with EIRP, OTA EVM and peak output power capabilities of the PAs comparable to the non-tapered antenna arrays. Therefore, the benefits of using tapered antenna arrays (i.e., reduction of side lobes, leading to reduced inter-beam and inter-sector interferences) come mostly at a price of increased average output power capabilities of the PAs.

For tapered antenna arrays, advantages of the compensation method described herein can include the following:

Compared with using PAs with higher peak output power capabilities, the same peak output power capabilities as for non-tapered arrays can be used. This leads to lower product cost and lower power consumption (due to both lower required peak power capabilities of PAs and operation closer to PAS saturation points—with a higher power added efficiency).

Compared with compensation of distortions using antenna reservation, there is no need for additional antennas dedicated for transmission of the compensation signals. This leads to lower product cost and lower power consumption, due to less TX chains and AEs.

Compared with compensation using the approach based on modification of radiation patterns of distortions, there is a separation between distorting and compensating antennas.

This can lead to lower complexity in the digital signal processing required for compensation (since up to 50% of antennas may be used for compensation), further leading to lower product cost and lower power consumption.

While a base station may be configured to perform the compensation method, the final effect can be observed after combining the signals from all AEs, i.e., after passing through a MIMO or MISO (multiple input, single output) channel, at the UE receiver.

Next, distortions received by UEs as described in FIG. 1 are explained in more detail. For each of J SCs, a precoded data vector $x_j$ can be constructed by summing up K per UE data samples $s_{k,j}$ multiplied by K per UE M×1 precoding vectors $w_{k,j}$. That is:

$$x_j = \sum_{k=1}^{K} x_{k,j} = \sum_{k=1}^{K} w_{k,j} s_{k,j}.$$

Therefore, the signal received by the k-th UE at the j-th SC can be described as:

$$y_{k,j} = h_{k,j}^H (x_j + d_j) = n_{k,j} = \left( h_{k,j}^H w_{k,j} s_{k,j} + \sum_{\substack{i=1 \\ i \neq k}}^{K} h_{k,j}^H w_{i,j} s_{i,j} \right) + h_{k,j}^H d_j + n_{k,j}$$

where $h_{k,j}^H$ is the 1×M vector of channel responses for the k-th UE, $d_j$ is the M×1 vector of per-antenna distortions in TX chains, and $n_{k,j}$ represents the RX noise at an antenna of the k-th UE.

It is assumed herein that the inter-UE interferences are handled (e.g., they are reduced by zero forcing (ZF) precoding) in a way that impact of the interferences becomes negligible:

$$\sum_{\substack{i=1 \\ i \neq k}}^{K} h_{k,j}^H w_{i,j} s_{i,j} \cong 0,$$

therefore:

$$y_{k,j} \cong h_{k,j}^H w_{k,j} s_{k,j} + h_{k,j}^H d_j + n_{k,j},$$

where $h_{k,j}^H w_{k,j}$ is the effective precoded channel $g_{k,j}$.

Simplifying further, when the RX noise $n_{k,j}$ is negligible as well, we have:

$$y_{k,j} \cong g_{k,j} s_{k,j} + h_{k,j}^H d_j,$$

where $h_{k,j}^H d_j$ is the unwanted distortion $u_{k,j}$ that reaches the k-th UE in j-th SC. The compensation method disclosed herein may effectively lead to a reduction of the level of these unwanted distortions.

After reception by the UE, the received symbol $y_{k,j}$ is equalized based on pilot signals (i.e., demodulation reference signal for physical downlink shared channel in 5G NR), which in case of perfect equalization leads to using $g_{k,j}^{-1}$ as the equalization coefficient:

$$z_{k,j} = \frac{y_{k,j}}{g_{k,j}} \cong s_{k,j} + \frac{u_{k,j}}{g_{k,j}} = s_{k,j} + e_{k,j},$$

where $z_{k,j}$ is the equalized symbol and $e_{k,j}$ is the symbol error at the j-th SC. The EVM value can be calculated as the ratio between the magnitudes of vectors of the error $|e_{k,j}|$ and the wanted symbol $|s_{k,j}|$.

If additional TX antennas $M_r$ that are reserved for transmitting distortion compensation signals were used, the signal received by the k-th UE on the j-th SC would be $y_{k,j} = h_{k,j}^H x_{k,j} + h_{k,j}^H d_j + \tilde{h}_{k,j}^H c_j$, where $\tilde{h}_{k,j}^H$ is the 1×$M_r$ vector of channel responses between the reserved compensation antennas and the k-th UE, while $c_j$ is the $M_r$×1 vector of per-antenna compensation signals. In this case, full compensation could be possible when $\tilde{h}_{k,j}^H c_j = -h_{k,j}^H d_j$. However, the compensation will be only partial when the number of reserved antennas $M_r$ is relatively small compared with the number of main antennas M. This is experienced because the compensation signal $c_j$ goes through per antenna processing chain in the base station which is also limited in both average and peak power, similarly like the main antennas, and hence can get distorted. The main problem of this antenna reservation approach is the need to use additional antennas dedicated for transmission of the compensation signals. This leads to higher product cost and power consumption for a given achievable EIRP.

An example embodiment provides a method for compensation of transmitter distortions, wherein compensating antennas are used, but the use of antenna reservation for the compensation purpose is avoided. Instead, M TX antennas are split into the two disjoint subsets. The two subsets comprise $M_d$ distorting antennas, which distortions are compensated, and $M_c$ compensating antennas, and where $M_d \cup M_c = M$ and $M_d \cap M_c = \emptyset$.

From a signal processing perspective, a main difference compared with the antenna reservation is that compensation signals are combined with the wanted signals and transmitted over a subset of M TX antennas (i.e., only $M_c$), instead of being transmitted separately in additional dedicated reserved compensating antennas $M_r$. Further, distortions from a subset of M TX antennas (i.e., only Ma) are compensated, instead of compensating distortions from all M antennas. For each J SCs, a partial compensation of distortions $d_j$ from the $M_d$ subset can be achieved by transmitting compensation signals $c_j$ from a different subset of $M_c$ compensating antennas.

If both the inter-user interferences and RX noise can be ignored, the symbol received by the k-th UE at j-th SC (during a given OFDM symbol) is $y_{k,j} \cong h_{k,j}^H x_{k,j} + h_{k,j}^H d_j + \tilde{h}_{k,j}^H c_j$, where $\tilde{h}_{k,j}^H$ is the 1×$M_c$ vector of channel responses between the compensating antennas and the k-th UE, while $c_j$ is the $M_c$×1 vector of per-antenna compensation signals. It is noted that $\tilde{h}_{k,j}^H \subset h_{k,j}^H$, since $h_{k,j}^H$ covers the responses from all M TX antennas. This is a difference compared with antenna reservation, where $\tilde{h}_{k,j}^H \neq h_{k,j}^H$.

Figure 5:
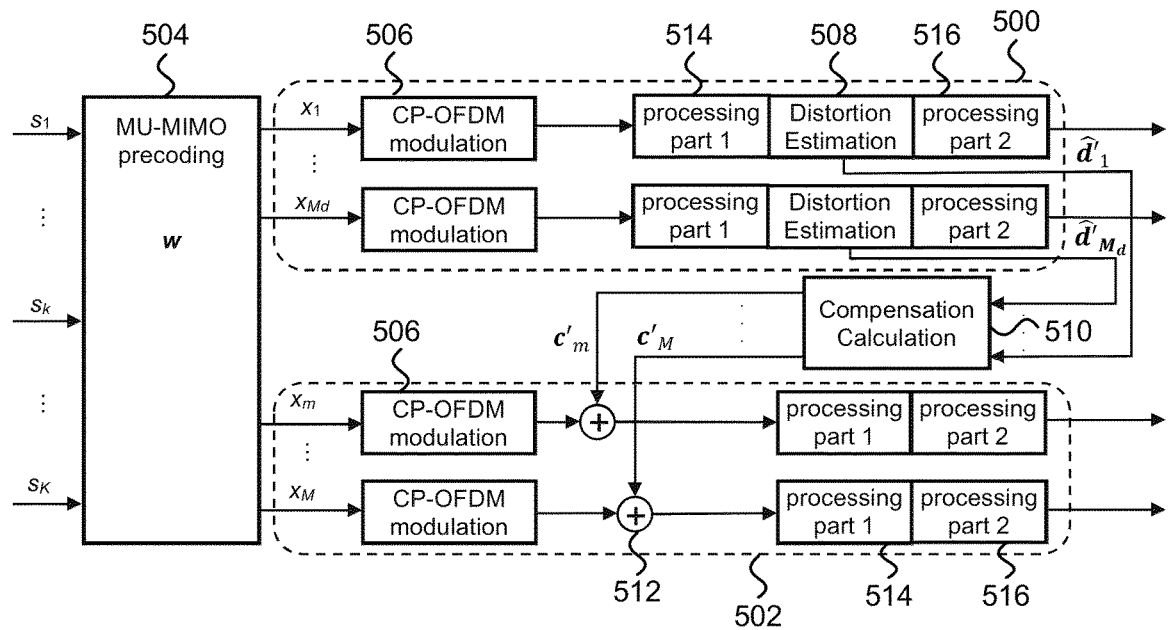
FIG. 5 illustrates an example block diagram of a compensation method using tapered antennas according to an example embodiment.

FIG. 5 illustrates an example block diagram of a downlink processing chain of a base station for compensation using tapered antennas according to an example embodiment. In FIG. 5, selected elements of the downlink processing chain for a single 5G NR carrier are shown.

With the described method, only a partial compensation may be feasible in practice, since the compensation signal is calculated only for a subset of transmit antennas $M_d$. There can be remaining uncompensated error coming from the subset of compensating antennas $M_c$, where the compensation signal is combined with the wanted signal. It is assumed that the most relevant distortion sources are covered by distortion estimation, allowing for a negligibly small portion of the signal error to remain uncompensated. In practice a full compensation may not be required. It may be enough to reduce the distortions to a level that is tolerable for the used MCSs (i.e., so that the EVM constraint is not exceeded).

There are $M_d$ distortion estimation blocks 508, i.e., one per each distorting antenna path 500. The distortion antenna path 500 may comprise transmission paths of antennas operating below a power headroom (transmit antennas $M_d$). In addition, there is a single compensation calculation block 510 configured for processing compensation signals for all $M_c$ compensating antenna paths 502. The compensating antenna path 502 may comprise transmission paths of antennas having a power headroom (compensating antennas $M_c$). The distortion antenna path 500 and the compensating antenna path 502 are associated to a same antenna array. Details of the distortion estimation block 508 depend on the type of distortions that are estimated and the estimation approach. For example, for the PAPR reduction based on peak-limiter type of approaches like ICF, the clipped part of the signal (i.e., the difference between the signals at the output and input of a PAPR reduction block) could be used directly or some approximation providing acceptable accuracy could be used instead. For example, the PAPR reduction mechanism may be at least partly comprised in a first processing part of the DL processing chain (e.g., a processing part 1 514 in FIG. 5). The first processing part may also comprise other processing mechanisms which distortions can be estimated by the estimation block 508. For example, a PA can be either in the first processing part or in a second processing part (e.g., a processing part 2 516 in FIG. 5). The PAPR mechanism may be also split between the first processing part and the second processing part, for example, when using an iterative approach. In this case a partial correction of PAPR reduction distortion would be possible.

Figure 6:
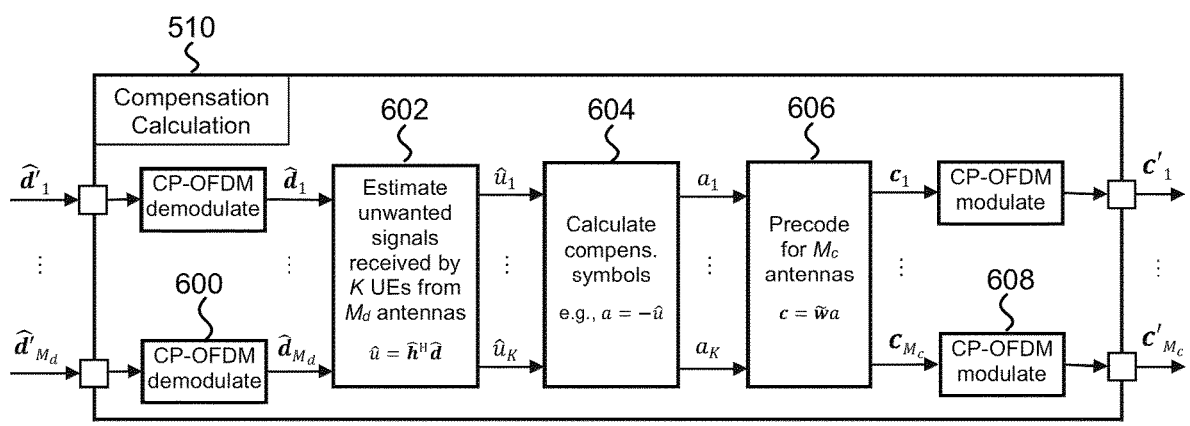
FIG. 6 illustrates an example diagram of a compensation calculation block according to an example embodiment.

It is assumed that the distortion estimation block 508 provides the distortion estimation in the time domain and the time-frequency conversion is performed in the compensation calculation block 510, as illustrated in FIG. 6. However, this is a functional split selected to clearly visualize all the relevant processing steps without a detailed definition of the distortion estimation block 508. In the end, an optimal split of functionalities between these two blocks 508, 510 can be different and is implementation specific. For example, frequency domain symbols instead of time domain signals may be provided at an output of the distortion estimation block 508 to an input of the compensation calculation block 510. The functional separation into blocks may not imply implementation decisions, which can be made considering an optimal distribution of functionalities for a given target device.

At the input of the compensation calculation block 510, as shown in FIG. 6, there are $M_d$ time domain data streams $\hat{d}'_m$ received from the distortion estimation blocks 508 which represent the per-antenna estimates of a portion of the time-domain distortions $d'_m$ (with a frequency-domain representation denoted by $d_m$) applying to the wanted signal in the m-th antenna path. The estimates of distortions can go through a CP-OFDM demodulation block 600 to generate the frequency-domain representation of distortion estimates $\hat{d}_m$ (i.e., $M_d \times 1$ vector per subcarrier per OFDM symbol).

In an embodiment, a partial representation of a part of the downlink path distortions may be used instead of fully capturing the per antenna distortions signals. This enables to reduce latency but may have a negative impact on the achievable compensation accuracy. For example, when the distortion estimation block 508 is located in between the first processing part and the second processing part of the DL processing chain (with some split of functionalities between these parts), the distortion estimates $\hat{d}_m$ may cover the distortions introduced in processing part 1 block 514 but may not cover the distortions introduced in the processing part 2 block 516. Hence, the distortion estimates $\hat{d}_m$ can cover all the distortions $d_m$ if the processing part 2 block 516 does not introduce distortions.

Based on these estimates and the estimates of the channel responses $\hat{h}^H$ between $M_d$ base station antennas and K UEs, the unwanted parts of the signals received by UEs are estimated at 602 (i.e., $\hat{u}_{k,j}$ for k-th UE and j-th SC). Next, compensation symbols (e.g., $a_{k,j}$ for k-th UE and j-th SC) are calculated at 604 based on these estimates. Either a full compensation (i.e., $a_{k,j}=-\hat{u}_{k,j}$) or a partial compensation can be configured.

In the following step, at 606, precoded compensation symbols $c_j$ for the j-th SC are calculated based on K per UE $M_c \times 1$ vectors of precoding weights $\tilde{w}_{k,j}$, which is a subset of the full precoding vector $w_{k,j}$ of $M \times 1$ size. Finally, the precoded compensation symbols can be passed through per-antenna CP-OFDM modulation blocks at 608 that generate time-domain precoded compensation signals $c'_m$. The time-domain precoded compensation signals can be then combined with the wanted signal in the subset of compensating antennas $M_d$ at 512 as illustrated in FIG. 5.

In one embodiment, the compensation signals c can be combined with the wanted signals x in the compensating antennas $M_c$ in the frequency domain (i.e., before x go through CP-OFDM modulation at 506 in FIG. 5). Alternatively, the compensation signals c can be combined with the data symbols s before MU-MIMO precoding at 504.

Also, generation of the compensation signals c in the compensation calculation block 510 based on the distortion estimates $\hat{d}'$ can be performed in various ways, and using the CP-OFDM modulation/demodulation and estimating the unwanted signals as described in FIG. 6 is one example.

In an embodiment, instead of statically separating the antennas to distorting and compensating subsets of antennas, the subsets could be dynamically changing during runtime based on a planned tapering solution. This would allow to assign antennas to the compensating subset based on the dynamically changing (in the scheduling rhythm) power headroom. The dynamically changing subsets of antennas may be applicable for a fully-connected solution, with compensating blocks that could change dynamically input and output signals connections. Also, major benefits are expected for relatively large headroom, like for tapered antenna arrays.

Benefits of the compensation method described herein comprise that the method may not impact the processing chain before the CP-OFDM modulation blocks 506, which may be an advantage from the system partitioning perspective. Additionally, the latency in the compensating antenna paths may be relatively low. However, additional precoding and CP-OFDM modulation blocks (e.g., 606, 608) may be needed, but these blocks may be simplified in relation to the blocks processing the wanted signal at 500 and 502, taking into account the special characteristics of the distortion compensation signals. Further, although CP-OFDM is used in this description since the results are provided for 5G NR, the method may be also adapted to different waveform types.

The compensation calculation block 510 may be roughly equivalent with the processing required for antenna reservation. However, there are also multiple differences between the processes. Firstly, there are $M_d$ (where $M_d \leq M/2$) instead of M input signals. Secondly, the precoding weights $\tilde{w}$ used to calculate the compensation signals are the same as the weights used for precoding of the wanted signal in the compensating antennas $M_c$ (i.e., they form a subset of all precoding weights w). Thirdly, compensation signals $c_m$ are combined with the wanted signals $x_m$, instead of using dedicated compensation antennas.

In the antenna reservation approach, the precoding weights in the dedicated antennas reserved for compensation are generally different than the weights used for precoding of the wanted signal. This leads to increased complexity and leads to a need of the channel state information (CSI) acquisition for these additional antennas. In the compensation method described herein, the precoding of the compensation signal may be based on the channel estimates using CSI acquired for the compensating antennas subset $M_c$.

Since the compensating antennas carry both the wanted signal $x_m$ and the compensation signal $c_m$, the compensation may be feasible in practice when there is enough average and peak power capability headroom in some of the antennas. Therefore, a main foreseen use case for the method is in case of tapered antenna arrays, for which significant power capability headroom can be expected. Some examples of performance in single-user (SU) and multi-user (MU) MIMO scenarios for tapered antenna arrays are provided next.

Figure 7:
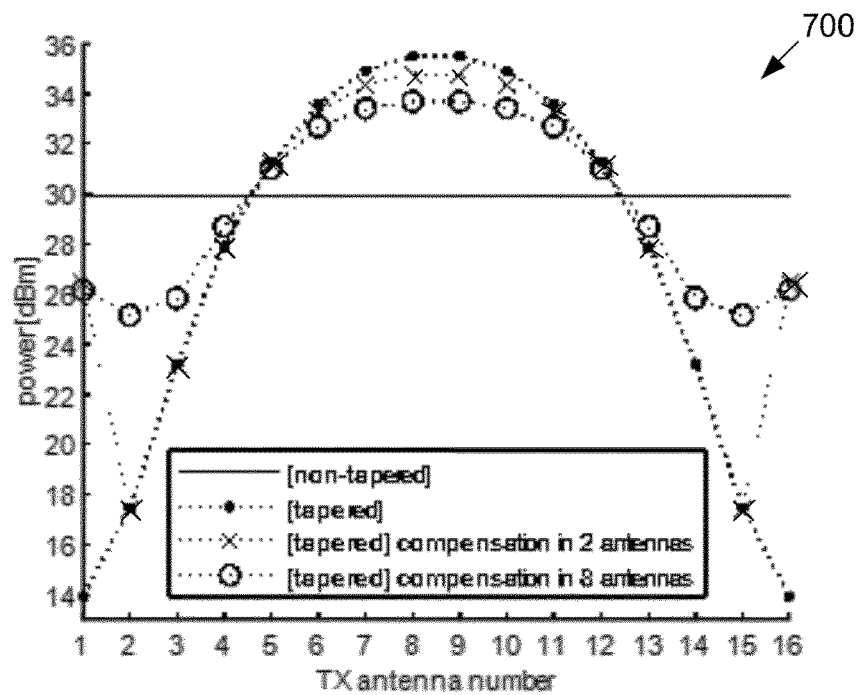
FIG. 7 illustrates an example graph of average output power capabilities for tapered and non-tapered antenna arrays without compensation and with compensation according to an example embodiment.

Usage of the compensation method may allow to reduce the peak power capabilities required to achieve a given EIRP with a given EVM in the tapered antenna arrays. Generally, the more compensating antennas are used and the larger the peak power headroom is, the better performance (translating to lower required peak and average output power capabilities) can be achieved. FIG. 7 illustrates an example of average output power capabilities and FIG. 8 illustrates an example of peak output power capabilities for antenna arrays not tapered and tapered with and without compensation for ULA using 16 omni-directional antenna elements.

Figure 8:
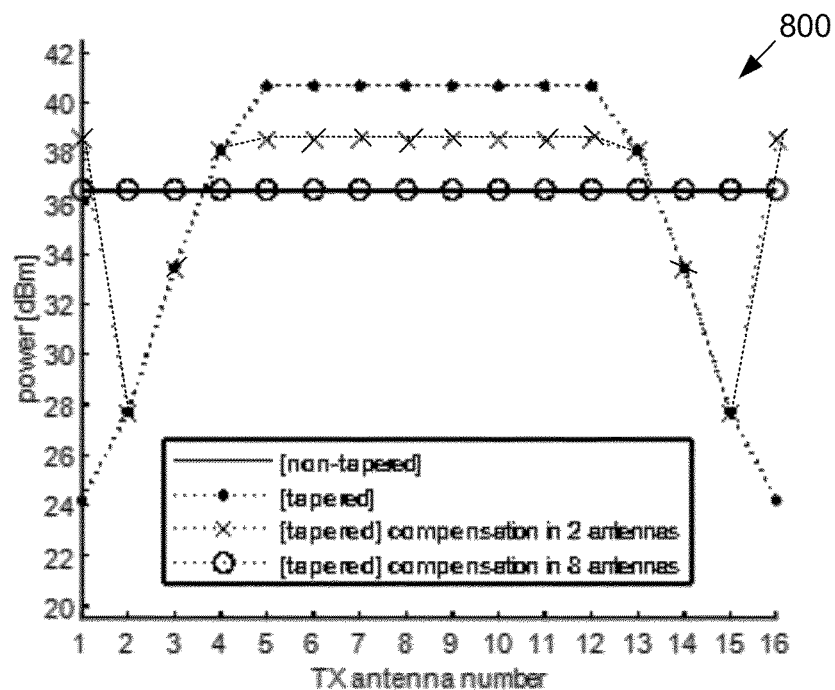
FIG. 8 illustrates an example graph of peak output power capabilities for tapered and non-tapered antenna arrays without compensation and with compensation according to an example embodiment.
Figures 9, 10:
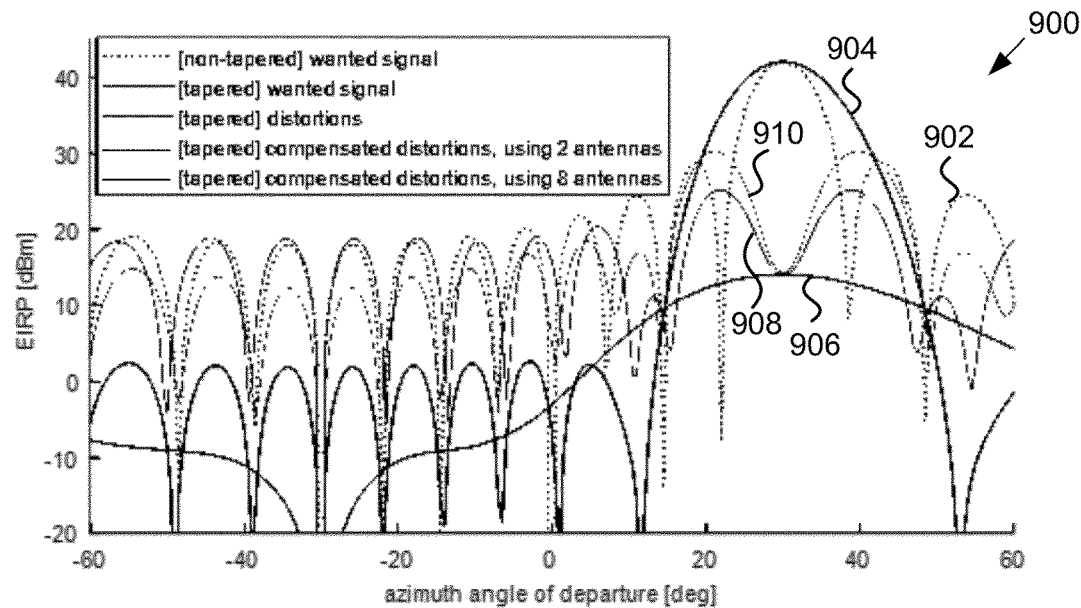
FIG. 9 illustrates an example graph for comparison of radiation patterns of a wanted signal, distortions without compensation and distortions with compensation according to an example embodiment.
FIG. 10 illustrates a table with comparison of example error vector magnitudes without compensation and with compensation of transmitter distortions according to an example embodiment.

A partial benefit in terms of the required peak and average output power capabilities is available even with limited number of compensating antennas, as shown in graph 700 of FIG. 7 and graph 800 of FIG. 8 for the case of two compensating antennas. In this situation, it may be possible to achieve a comparable reduction of the power of distortions radiated towards the UE like in a case of eight antennas. The case of eight antennas is illustrated by graph 900 in FIG. 9 showing a comparison of radiation patterns of wanted signal and distortions for ULA using 16 omni-directional antenna elements to transmit to a UE located at 30 degrees azimuth angle. In graph 900, there is shown a non-tapered wanted signal 902, tapered wanted signal 904, uncompensated tapered distortions 906, compensated distortions when using 2 tapered antennas 908 and compensated distortions when using 8 tapered antennas 910.

For the same requirements on EIRP and EVM and the same peak power constraint as in the non-tapered case, it would be needed to use more than 6 additional reserved antennas (i.e., >37% increase in the number of TX antennas) in case the compensation was done using the antenna reservation approach instead.

A significant improvement may be experienced in SU-MIMO case, however the described compensation method performs well in MU-MIMO scenarios also. FIG. 10 illustrates an example comparison of EVMs with and without compensation of transmitter distortions, in table 1000. Here, a tapered antenna array with 32 directional antenna elements (8 dBi, 65 deg 3-dB beamwidth) is used for transmission over line-of-sight (LoS) channels to UEs located at randomly selected azimuth angles. Results of mean EVM over all UEs are presented in the table 1000 with and without compensation of PAPR reduction distortions for antenna arrays operating with the same peak power capabilities and with average power on a level leading to comparable received power levels. The results are shown for 1, 2, 4 and 6 UEs. It is visible that usage of $M_c=8$ out of a total of 32 M antennas provides a substantial EVM improvement against the tapered antenna already in each of the verified scenarios.

For MU-MIMO cases, a lower output power or PAs with somewhat higher peak power capabilities could be used in order to avoid the increased level of sidelobes caused by the compensated distortions, as illustrated for a single UE case in FIG. 9. This would allow for the UEs in such scenarios to reach lower EVM levels compared with the results shared in table 1000.

Usage of the compensation method in tapered antenna arrays allows to use the average and peak output power headroom in the outermost antennas of an antenna array to compensate for the distortions introduced in the center antenna elements. This may enable lower EVM (i.e., enabling higher downlink throughput) when either the EIRP requirement is reduced or the peak power capability is increased compared with the non-tapered antenna array. Further, it may be possible to keep the EIRP and EVM as for non-tapered antenna array with no or limited increase of the required peak output power capabilities.

Compared with the approach of using PAs with higher peak output power capabilities, to keep the EIRP and EVM constraints, lower product cost and lower power consumption (due to operation in a higher efficiency region of the PAs) can be expected. In relation to antenna reservation type of approaches, no additional dedicated antennas for compensation of distortions are needed. This clearly leads to lower product cost and dimensions, and hence lower weight and decreased wind-load. There is also no need to acquire CSI for the dedicated antennas reserved for compensation.

In case the tapering for a given device is statically configured (i.e., not achieved by reducing the gain of precoding weights) with equal PAPR between antennas, the PAs used in different antenna paths can be different, with both average and peak power capabilities aligned with the selected tapering weights. In this case the benefits of the compensation method would be limited, since its usage relates to a fact that a subset of antennas have a margin in relation to both average and peak power limits. However, usage of statically tapered antennas with equal PAPR leads to a non-homogenous design, with multiple different pairs of PAs and may not allow to use the antenna as non-tapered due to lack of average and peak power capabilities. Hence, it is assumed that a homogenous design is used especially when the peak power capability of PAs used in a tapered antenna array can be on par with the capabilities required for a non-tapered array. This enables a flexibility to dynamically switch between tapered and non-tapered modes of operation while keeping the constraints on the EIRP and EVM in both modes.

Figure 11:
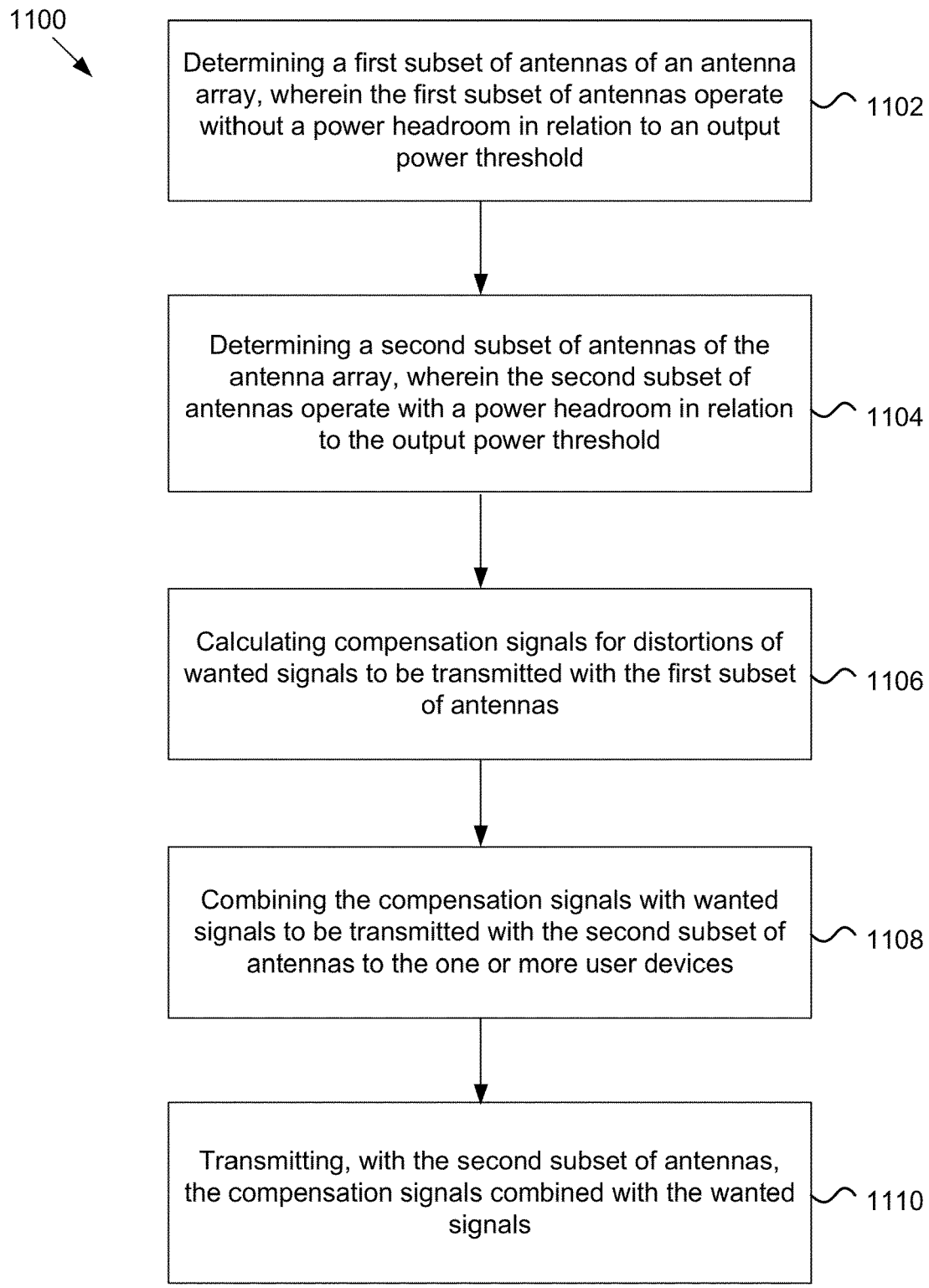
FIG. 11 illustrates an example of a compensation method for transmitter distortions using tapered antenna elements according to an example embodiment.

FIG. 11 illustrates an example of a compensation method 1100 for transmitter distortions using tapered antenna elements according to an example embodiment. The method may be performed by a computing device, such as the apparatus 200. In an embodiment, the apparatus 200 may comprise a base station.

At 1102, the method may comprise determining a first subset of antennas of an antenna array, wherein the first subset of antennas operate without a power headroom in relation to a threshold. The threshold may be determined. for example, based on an average output power over all antennas of the antenna array.

At 1104, the method may comprise determining a second subset of antennas of the antenna array, wherein the second subset of antennas operate with a power headroom in relation to the output power threshold.

At 1106, the method may comprise calculating compensation signals for distortions of wanted signals to be transmitted with the first subset of antennas to one or more user devices.

At 1108, the method may comprise combining the compensation signals with wanted signals to be transmitted with the second subset of antennas to the one or more user devices.

At 1110, the method may comprise transmitting, with the second subset of antennas, the compensation signals combined with the wanted signals.

Further features of the methods directly result from the functionalities and parameters of the apparatuses, as described in the appended claims and throughout the specification and are therefore not repeated here. It is noted that one or more operations of the method may be performed in different order.

An apparatus, for example a computing device or a base station, may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A method, comprising:
    determining a first subset of antennas of an antenna array, wherein the first subset of antennas operate without a power headroom in relation to one or more thresholds;
    determining a second subset of antennas of the antenna array, wherein the second subset of antennas comprise one or more antennas that operate with a power headroom in relation to the one or more thresholds;
    calculating compensation signals for distortions of wanted signals to be transmitted with the first subset of antennas to one or more user devices;
    combining the compensation signals with wanted signals to be transmitted with the second subset of antennas to the one or more user devices; and
    transmitting, with the second subset of antennas, the compensation signals combined with the wanted signals,
    wherein calculation of the compensation signals comprises:
    receiving time domain data streams representing per-antenna estimates of a portion of the time-domain distortions of the wanted signals from the first subset of antennas;
    demodulating the time domain data streams to generate frequency domain representation of the distortion estimates;
    estimating unwanted parts of the transmitted signals received by the one or more user devices from the first subset of antennas based on the frequency domain representation of distortion estimates and estimated channel responses between the first subset of antennas and the one or more user devices;

calculating compensation symbols based on the estimated unwanted parts of the transmitted signals;

precoding the compensation symbols with precoding weights of the wanted signals of the second subset of antennas; and modulating the precoded compensation symbols to generate a time-domain precoded compensation signal for each antenna of the second subset of antennas.

2. The method of claim 1, wherein the antenna array is a tapered antenna array.

3. The method of claim 1, wherein the one or more thresholds are based on power capabilities and one or more additional constraints related to the antenna array.

4. The method of claim 1, wherein the one or more thresholds are antenna-specific.

5. The method of claim 1, comprising:
performing distortion estimation for each antenna path of the first subset of antennas for the wanted signal;

calculating the compensation signals for each antenna path of the second subset of antennas based on the estimated distortions; and combining the compensation signals with the wanted signals of each antenna path of the second subset of antennas.

6. The method of claim 5, wherein the estimated distortions are provided as frequency domain symbols or time domain signals.

7. The method of claim 1, wherein the compensation signals are
combined with the wanted signals of the second subset of antennas in the time-domain after modulation of the respective wanted signals.

8. The method of claim 1, wherein the compensation signals are
combined with the wanted signals of the second subset of antennas in the frequency domain before modulation of the respective wanted signals.

9. The method of claim 1, wherein the compensation signals are
combined with the wanted signals of the second subset of antennas by combining the compensation signals with data symbols for the wanted signals before precoding of the data symbols.

10. The method of claim 1, comprising:
performing a peak-to-average-power ratio, PAPR, reduction for each wanted signal; and estimating the distortions based on a difference between the wanted signals of the first subset of antennas before and after the PAPR reduction.

11. The method of claim 1, wherein the compensation signals
are calculated based on at least a partial representation of the distortion.

12. The method of claim 1, comprising:
updating the first subset of antennas and the second subset of antennas based on a dynamically changing power headroom.

13. The method of claim 1, wherein the first subset of antennas
and the second subset of antennas are determined statically based on a planned tapering solution.

14. An apparatus, comprising:
at least one processor; and at least one memory including instructions which, when executed by the at least one processor, cause the apparatus at least to perform the method of claim 1.

15. An apparatus, comprising:
means for performing the method of claim 1.

* * * * *